UNITED STATES PATENT OFFICE.

ISAAC KAUFMAN, OF BALTIMORE, MARYLAND, ASSIGNOR OF TWO-FIFTHS TO ROBERT C. DOTSON AND JACOB M. MOSES, OF SAME PLACE.

COMPOUND FOR ARTIFICIAL FUEL.

SPECIFICATION forming part of Letters Patent No. 648,462, dated May 1, 1900.

Application filed August 12, 1899. Serial No. 726,957. (No specimens.)

*To all whom it may concern:*

Be it known that I, ISAAC KAUFMAN, a citizen of the United States, residing in the city of Baltimore, in the State of Maryland, have invented certain new and useful Improvements in Compounds for Artificial Fuel, of which the following is a specification.

My improved artificial fuel is composed of ingredients which are readily ignitible and which furnish a hot flame with a minimum amount of smoke, and it includes sufficient adhesive material which is also combustible to bind the ingredients together, so that they may be formed into bricks of desirable dimensions.

The ingredients contained in my composition fuel, their proportions, and the manner of mixing them will be understood from the following description, which applies to a mass sufficient in volume to form one dozen bricks eight inches long by four inches wide and three inches thick. In order to form a mass of this volume, I place five pounds of resin in a suitable vessel and apply sufficient heat to the vessel to melt the resin. When this has been accomplished, I add separately three ounces of tallow, one ounce of sal-soda, two ounces of alum, and two ounces of cider-vinegar, the mass being stirred or agitated while the several ingredients named are being added to the mixture. I then add one-half pound of flour paste, twenty pounds coal-dust or culm, and ten ounces of sawdust, the sawdust and culm being first thoroughly mixed. The mass is stirred to make the mixture as uniform as possible, and it is then poured into suitably-shaped molds and allowed to cool. It is then ready for use.

The tallow and resin render the composition readily combustible, so that it may be ignited by applying a lighted match to it. The sawdust and coal-dust, which are waste products, furnish body and carbon to the mass. The flour paste is used for the purpose of cohesion, and sal-soda also aids in this respect. The sal-soda and alum allay the smoke, and I have found that the addition of cider-vinegar reduces the smoke to an insignificant quantity.

The proportions of my ingredients may of course be varied somewhat; but I have found the proportions indicated above to be most desirable.

Having described my invention, what I claim, and desire to secure by Letters Patent, is—

1. An artificial fuel composed of resin, tallow, sal-soda, alum, cider-vinegar, flour paste, coal-dust and sawdust, substantially as described.

2. An artificial fuel composed of resin, tallow, sal-soda, alum, cider-vinegar, flour paste, coal-dust and sawdust, in the proportions substantially as specified.

In testimony whereof I affix my signature in presence of two witnesses.

ISAAC KAUFMAN.

Witnesses:
  JOSH. MORRELL,
  A. W. SEIPPEL.